United States Patent [19]
Takano et al.

[11] Patent Number: 5,923,800
[45] Date of Patent: Jul. 13, 1999

[54] OPTICAL WAVEGUIDE MODULE HAVING MAIN-LINE WAVEGUIDE AND BRANCH WAVEGUIDES, AND OPTICAL TRANSMISSION DEVICE INCLUDING SUCH OPTICAL WAVEGUIDE MODULE

[75] Inventors: Toshihiko Takano; Michio Ohba; Hisashi Ohwada; Yasunari Kawabata; Hamaho Hashimoto; Kuniaki Jinnai, all of Tokyo, Japan

[73] Assignee: Mitsubishi Gas Chemical Company, Inc., Tokyo, Japan

[21] Appl. No.: 08/920,899

[22] Filed: Aug. 29, 1997

[30] Foreign Application Priority Data

Aug. 29, 1996 [JP] Japan .................... 8-228449

[51] Int. Cl.$^6$ .................... G02B 6/26
[52] U.S. Cl. .................... 385/45
[58] Field of Search .................... 385/45–48, 147

[56] References Cited

U.S. PATENT DOCUMENTS

| 4,252,402 | 2/1981 | Puech et al. | 385/40 |
| 4,684,245 | 8/1987 | Goldring | 356/41 |

FOREIGN PATENT DOCUMENTS

| 0 221 357 A2 | 5/1987 | European Pat. Off. . |
| 0 221 357 A3 | 5/1987 | European Pat. Off. . |
| 0 376 630 A1 | 12/1989 | European Pat. Off. . |
| 0 550 421 A2 | 7/1993 | European Pat. Off. . |
| 0 550 421 A3 | 7/1993 | European Pat. Off. . |
| 36 01 729 A1 | 7/1987 | Germany . |
| 2 191 603 | 12/1987 | United Kingdom . |
| 2191603 | 12/1987 | United Kingdom ............ 385/45 |

OTHER PUBLICATIONS

English language abstract of Japanese Patent application 62009305, published on Jan. 17, 1987.

English language abstract of Japanese Patent application 56111819, published Sep. 3, 1981.

*Primary Examiner*—Akm E. Ullah
*Attorney, Agent, or Firm*—Wenderoth, Lind & Ponack, L.L.P.

[57] ABSTRACT

An optical waveguide module having a main-line waveguide, which is excellent in optical branching properties, important properties of a bus communication network, and the reproducibility of the above branching properties and is easy to produce, and an optical transmission equipment having the above optical waveguide module. The optical waveguide module having a main-line waveguide which is connected to the optical transmission path and works as part of the optical transmission path and a pair of branch waveguides (21,22) which are unidirectionally branched from the main-line waveguide, the main-line waveguide and the branch waveguides being formed by providing an optically transparent polymer film with a refractive index distribution, a light-receiving device (25) being connected to one (21) of a pair of the branch waveguides, a light-emitting device (26) being connected to the other (22).

7 Claims, 6 Drawing Sheets

OPTICAL WAVEGUIDE MODULE HAVING MAIN-LINE WAVEGUIDE AND BRANCH WAVEGUIDES, AND OPTICAL TRANSMISSION DEVICE INCLUDING SUCH OPTICAL WAVEGUIDE MODULE

FIELD OF THE INVENTION

The present invention relates to an optical waveguide module having a main-line waveguide suitable for use with an optical fiber transmission system using a multi-drop line method, and transmission equipment for which it is adapted. More specifically, it relates to an optical waveguide module suitable for use in an optical communication network using a multi-drop method in which data can be exchanged by sharing one or two optical transmission paths between a plurality of terminals and a control unit, or between a plurality of terminals in a serial-transmission optical communication system.

PRIOR ART

A variety of communication systems, communication network structures and communication procedures have been so far developed, and computerized digital communications are utilized.

In these communication networks, medium-scale networks covering transmission distances of several kilometers mainly use electrical transmissions through coaxial cables or twisted pair cables.

In a communication network using cables, it is necessary to prevent or reduce electromagnetic noises when a source of a noise caused by electromagnetic radiation is located nearby, and in a connection through an aerial cable between buildings, it is necessary to prevent or prepare for a strike. In business facilities where specific chemical products are handled, it is necessary to prevent the threat of an explosion.

In electrical communication using a multi-drop method, it is difficult to limit the propagation direction of electric signals to one direction, and a signal transmitted by a station is also received by a receiver of the same station. Therefore, the prevention thereof requires an electronic circuit which can invalidate the receipt of the signal transmitted by the station of its own.

In contrast, a optical transmission using an optical fiber obviates the measures against electromagnetic noise and lightning strike and the measures for the prevention of explosion and therefore, setting is simple and designing is easy. As a result, a total cost can be decreased. Further, since light has a propagation direction, it permits directional coupling which electric signals do not, so that it is easy to prevent a station from receiving signals transmitted by the same station. As a result, no additional circuit is required for invalidating the receipt of signals of its own station, or the invalidation can be attained with a simple circuit.

Under the circumstances, various transmission systems developed according to methods using electric cables have been studied also in the field of optical transmission with an optical fiber, and their practical use is beginning.

In the field of optical transmission, an optical communication network using a star coupling system is used in many cases.

The optical communication network using a multi-drop line method has advantages over the above optical communication network using a star coupling system.

In the star-coupling optical communication network, because it is required to provide optical fibers from the star branching device in the number equivalent to the number of devices, a great number of optical transmission paths are provided around the star branching device. As a result, a setting space and a setting cost impose limitations on the star-coupling optical communication network.

On the other hand, in the multi-drop line method, a plurality of terminals can be connected through one transmission path of one optical fiber or a pair of two optical fibers, and as a result, a setting space and a setting cost can be decreased.

Optical communication according to a multi-drop line method can directly use communication procedures (protcol) developed for a multi-drop line method in an electric communication network. An electric circuit constituting optical/electric and electric/optical conversion portion can be actualized by adding a circuit which drives a light-receiving device and a light-emitting device to an electric circuit which actualizes the above protocol.

For example, as a communication means based on a control method by a bus master which controls entire transmission equipment (master/slave method), there is a well known communication system based on a bus type control using RS485. Further, as a communication means of a connection system in which all transmission equipments are equivalent (pier-to-pier type), there can be directly used a communication system based on ISO/IEC 8802-3 (known as Ethernet) having transmission procedures (protocol) such as a collision detecting feature and a recognition feature for individual transmission equipment.

The above transmission procedures are already standardized, and dedicated communication ICs are already commercially available, so that these are relatively easily built in an input-output portion of transmission equipment in the present invention.

As discussed above, the optical transmission system using the multi-drop line method has excellent functions.

In the transmission based on the mult-drop line method, not only a transmission loss occurs, but also a loss caused by fetching a branched signal occurs, since a plurality of transmission devices are connected. The number of the devices that can be connected to one optical fiber is therefore limited. When the ratio of the received-light intensity of a terminal adjacent to a terminal which transmits a signal to the received-light intensity of a terminal which is connected through several transmission devices is too large, it exceeds the dynamic range of the amplification circuit of a light-receiving device. It is therefore no longer possible to set the received-light intensity such that all the terminals from the first terminal to the last can have a received-light intensity in a proper range.

When the maximum number of devices to be connected is n, a brief calculation is as follows.

The ratio of the intensity of light received by a first device having the largest received-light intensity to the light intensity of light received by an n-th device (the last device) having the lowest received-light intensity is calculated as follows.

Received-light intensity ratio $=\{(1-\alpha)(1-\delta)\}^{(n-1)}$ in which $\alpha$ is a branching ratio (ratio of the intensity of light which propagates through a branched portion to the intensity of incidence light) and $\delta$ is a transmission loss when light passes through a transmission device other than the branched portion.

A logarithm of the received-light intensity ratio is taken, and when $\delta$ and $\alpha$ are assumed to be very small, the following can be obtained as an approximate value on the basis of $\text{Log}(1-\alpha)\approx-\alpha$ and $\text{Log}(1-\delta)\approx-\delta$.

Log(received-light intensity ratio)=$-(n-1)(\alpha+\delta)$

When the dynamic range of the amplification circuit of the light-receiving device is X(dB), the maximum number of devices that can be connected is determined on the basis of the dynamic range.

Maximum number of devices: $1+X/(10(\alpha+\delta))$ in which $\delta$ is a transmission loss of optical components such as an optical connector, an optical fiber and a plane optical waveguide, which loss cannot be easily decreased. For decreasing the transmission loss, it is effective to decrease the number of connections of optical elements and the number of optical components. It is also effective to decrease $\alpha$. That is, it is effective to decrease the branching ratio so that the quantity of branching light to a light-receiving device is decreased. By decreasing the values of these $\alpha$ and $\delta$, the number of devices that can be connected can be increased.

A non-uniform branching portion for the multi-drop line method can be constituted of an optical fiber coupler. However, it is difficult to fabricate a non-uniform branching device having a small branching ratio with a good reproducibility. Further, the transmission loss when light passes through the above transmission equipment can be decreased by decreasing the number of optical connection portions, and it is therefore preferred to avoid assembling the transmission equipment based on the multi-drop line method with a large number of optical components.

JP-A-58-9084 "Optical transmission network" and JP-A-64-50640 "Optical network system", which are considered to be related to the present invention, disclose optical transmission equipment using two optical fibers.

The inventions of the above publications suffer a great loss in transmission portions, since a plurality of optical components are combined due to the use of the multi-drop line method.

Further, another disadvantage is that the down-sizing of the transmission equipment is difficult because the equipment per se is constituted of a great number of optical components.

SUMMARY OF THE INVENTION

It is an object of the present invention to provide an optical waveguide module having a main-line waveguide, which is excellent in light branching properties which are important properties in a bus communication network, which is excellent in the reproducibility of the above branching properties and which is easy to produce.

It is another object of the present invention to provide an optical transmission device having the above optical waveguide module. The features of the optical transmission device are: that it has stable branching and transmission properties against changes in temperature and humidity; it shows a decreased degradation of the branching and transmission properties in environments which are full of fine particles of dust, etc., organic substances and corrosive gases; it can be applied to a field instrumentation system; and it is small in size and inexpensive.

According to the present invention, there is provided an optical waveguide module for branching, which is to be connected to an optical transmission path for receiving or transmitting an optical signal, the optical waveguide module having a main-line waveguide which is connected to the optical transmission path and works as part of the optical transmission path and a pair of branch waveguides (21,22) which are unidirectionally branched from the main-line waveguide, the main-line waveguide and the branch waveguides being formed by providing an optically transparent polymer film with a refractive index distribution, a light-receiving device (25) being connected to one (21) of a pair of the branch waveguides, and a light-emitting device (26) being connected to the other (22).

According to the present invention, further, there is provided an optical transmission device formed by connecting an electric circuit (2) designed to control the light-receiving device (25) and the light-emitting device (26) and an electric signal input/output portion (6) to the above optical waveguide module and placing these components in one box.

DETAILED DESCRIPTION OF THE INVENTION

The optical waveguide module having a main-line waveguide in the present invention preferably includes the following embodiments.

Figure 3:
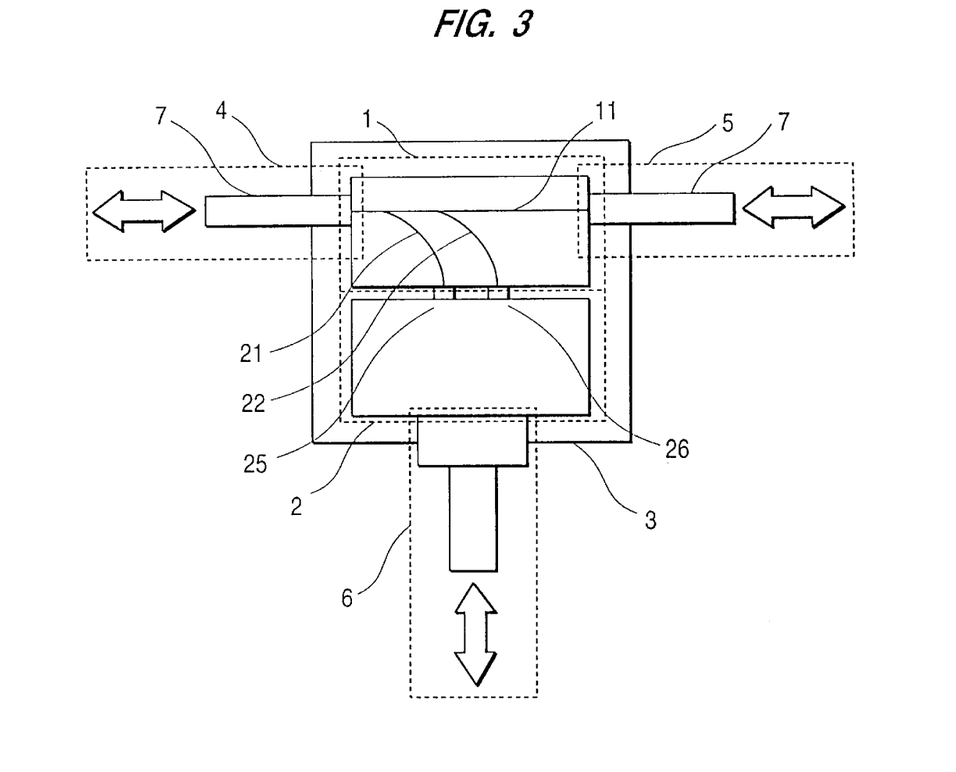
FIG. 3 is a schematic view of an optical transmission device having an optical waveguide module having one main-line waveguide.

① An embodiment in which one main-line waveguide (11) is provided and a pair of branch waveguides (21,22) are connected to a light-receiving device (25) and a light-emitting device (26), respectively (FIG. 3).

Figure 5:
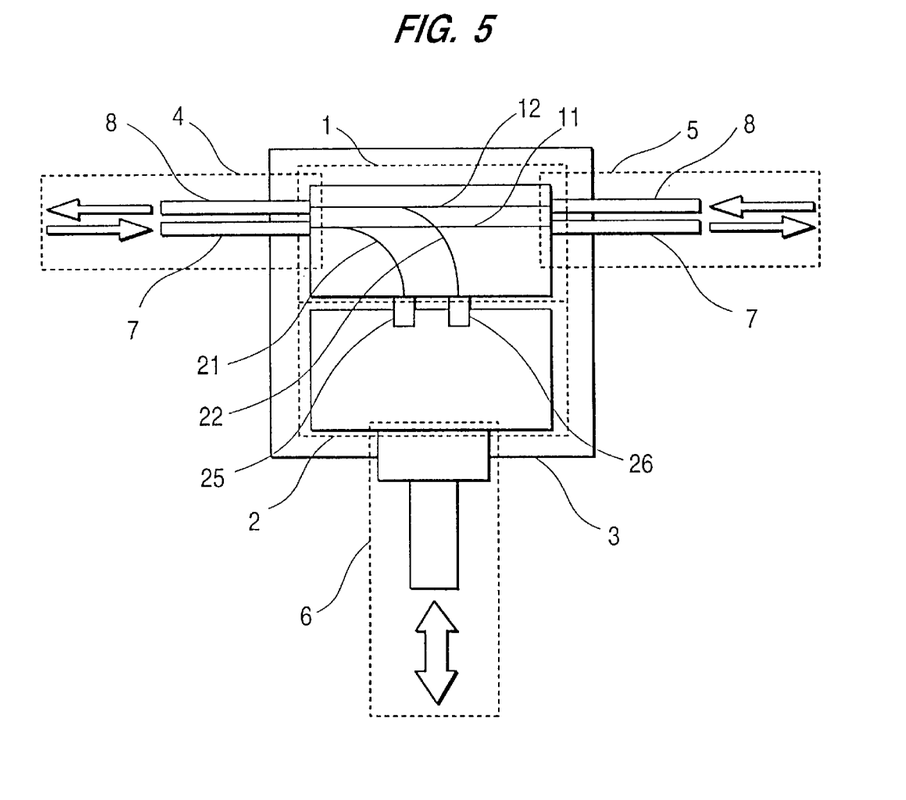
FIG. 5 is a schematic view of an optical transmission device having an optical waveguide module having two main-line waveguides.

② An embodiment in which two main-line waveguides (11,12) are provided, a pair of branch waveguides (21,22) are provided, one branch waveguide is branched from one mainline waveguide and the other branch waveguide is branched from the other main-line waveguide (FIG. 5).

Figure 7:
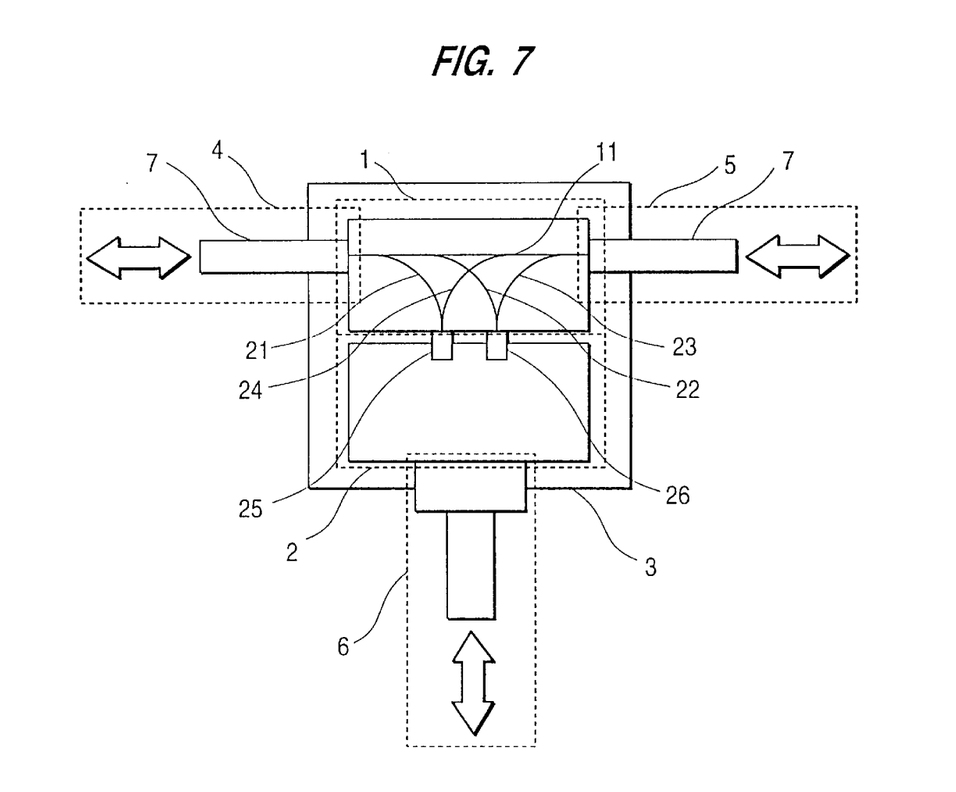
FIG. 7 is a schematic view of an optical transmission device using an optical waveguide module having one main-line waveguide in a method in which light is bilaterally transmitted and received.

③ An embodiment in which one main-line waveguide (11) is provided, two pairs of branch waveguides (21,22) and (23,24) are provided, the branch waveguides (21,22) are branched from one direction, the branch waveguides (23,24) are branched from the other direction, the branch waveguides (21,24) are connected to a light-receiving device (25) and the branch waveguides (22,23) are connected to a light-emitting device (26) (FIG. 7).

Figure 9:
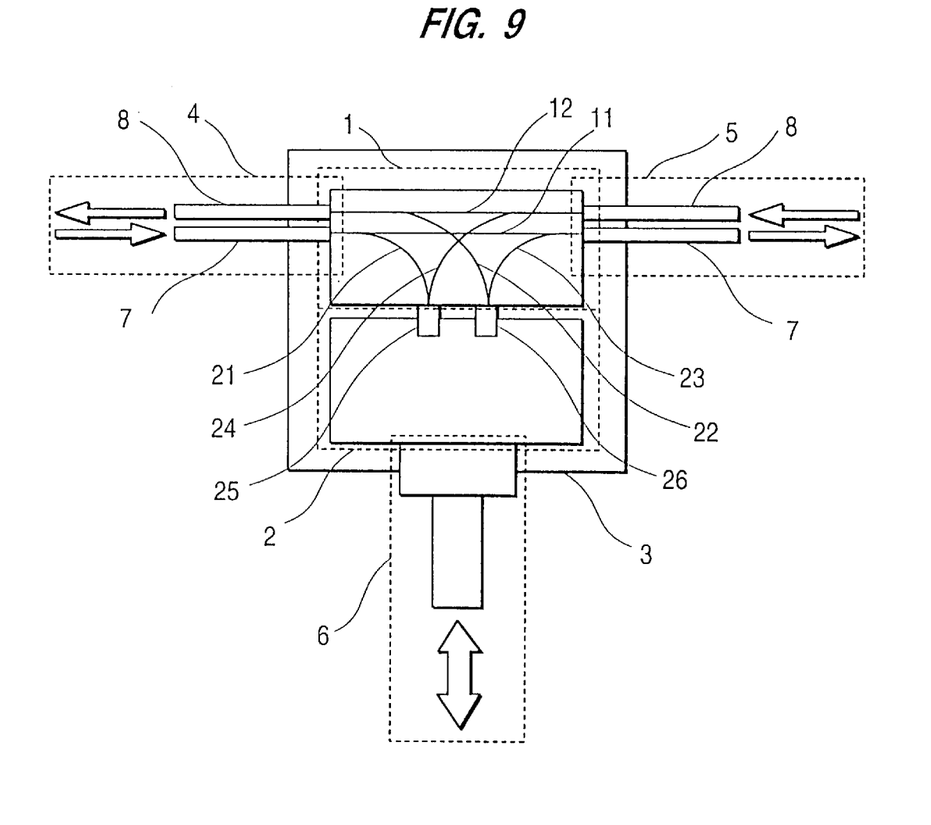
FIG. 9 is a schematic view of an optical transmission device using an optical waveguide module having two main-line waveguides in a method in which light is bilaterally transmitted and received.

④ An embodiment in which two main-line waveguides (11,12) are provided, two pairs of branch waveguides (21, 22) and (23,24) are provided, the branch waveguides (21,22) are branched from one direction, the branch waveguides (23,24) are branched from the other direction, the branch waveguides (21,23) are branched from the main-line waveguide (11), the branch waveguides (22,24) are branched from the main-line waveguide (12), the branch waveguides (21,24) are connected to a light-receiving device (25) and the branch waveguides (22,23) are connected to a light-emitting device (26) (FIG. 9).

In the optical waveguide module having a main-line waveguide provided by the present invention, preferably, the light-receiving device (25), and the light-emitting device (26) are connected to one end surface an optical waveguide module, and the other end surface opposite to the former end surface has an obliquely processed form.

In the present invention, the electric circuit (2) which controls the light-receiving device (25) and the light-emitting device (26), and the electric signal input/output portion of the electric circuit (2) are connected to the above optical waveguide module (1) having a main-line waveguide, and the resultant set is encased in a box (3) and used as an optical transmission device.

For easier understanding of the present invention, the present invention will be explained with reference to drawings.

Figure 1:
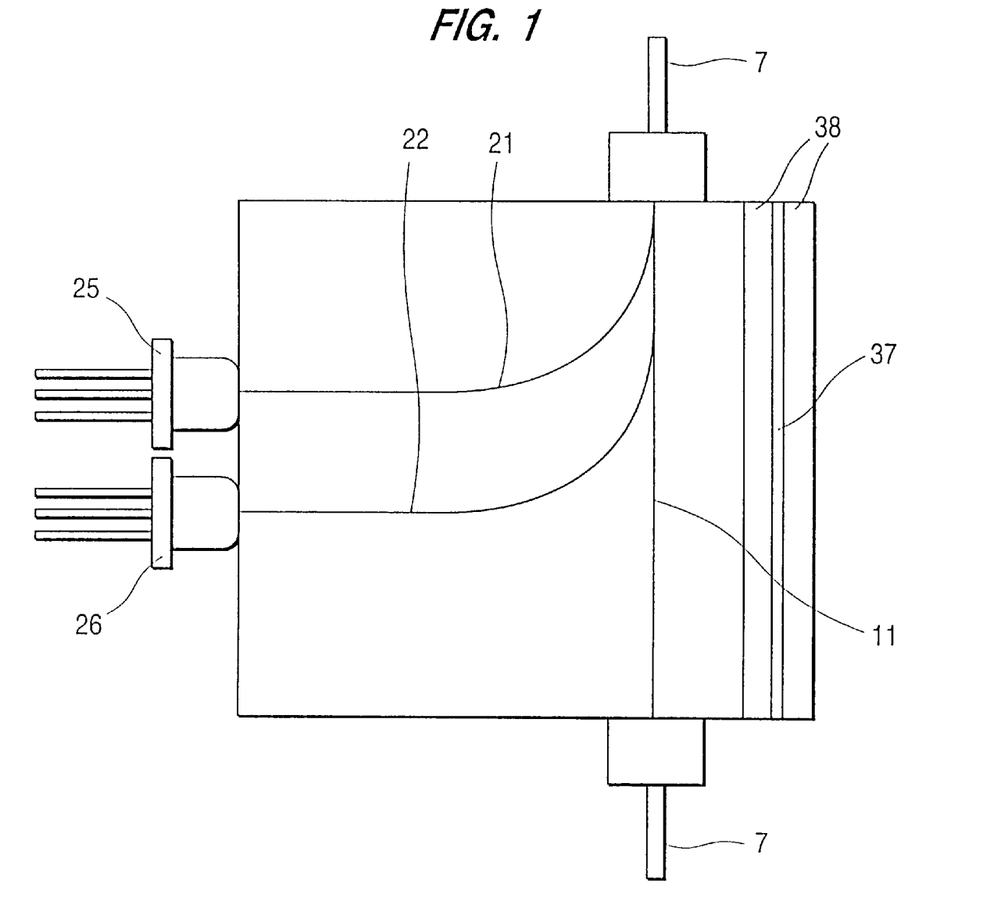
FIG. 1 is a schematic view of an optical waveguide module having one main-line waveguide.
Figure 2:
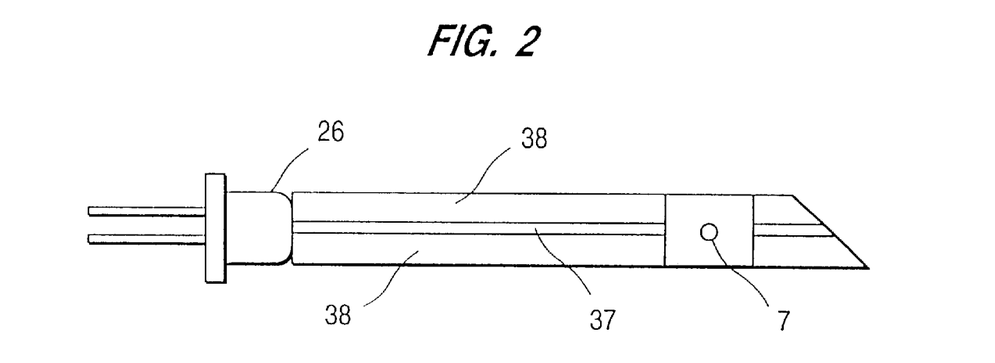
FIG. 2 is a side view of an optical waveguide module having one main-line waveguide.

FIG. 1 shows an example of a plan view of the optical waveguide module having an optical waveguide, provided by the present invention, and FIG. 2 is a side view thereof.

In the optical waveguide module shown in FIG. 1, a main-line waveguide (11) which is connected to a connection portion of an optical fiber transmission path (7) to form part of the optical fiber transmission path, and a pair of branch waveguides (21,22) which are unidirectionally branched from the main-line waveguide (11) are produced by forming a refractive index distribution in an optically transparent polymer film(37), so that the structure of a sandwich formed with two glass plates (38,38) is formed. The main-line waveguide (11) has junction portions (7) on both ends, and the junction portions are connected to one optical fiber transmission path, one end of one of the branch waveguides (21,22) is connected to a light-receiving device (25), and one end of the other is connected to a light-emitting device (26). The right end of the present module shown in FIG. 1 is obliquely cut as shown in FIG. 2, and the resultant oblique portion corresponds to portions shown by (38,37,38) on the right side in FIG. 1 and prevents the re-incidence of part of a signal to the light-receiving device (25), which signal comes from the light-emitting device (26) and is partially reflected from the right end.

FIG. 3 is a schematic view of an optical transmission device formed by connecting an electric circuit for controlling the light-receiving device (25) and the light-emitting device (26) and an electric signal input/output portion (6) of the electric circuit to the module (1) shown in FIGS. 1 and 2 and encasing these in one box (3).

Figure 4:
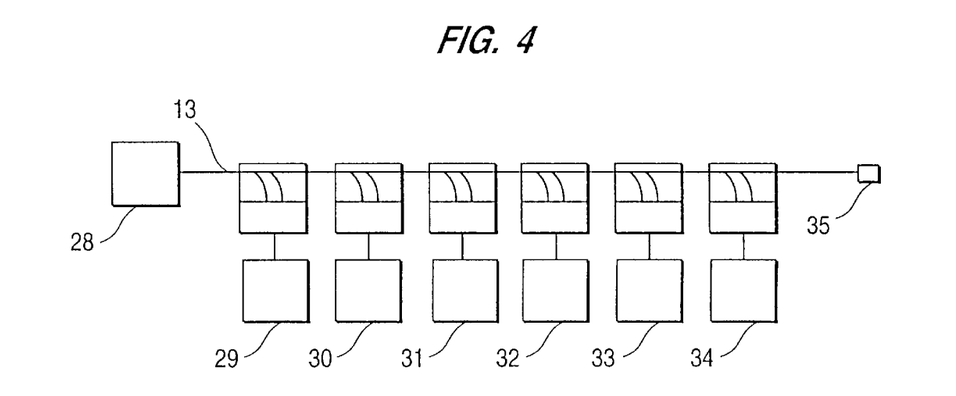
FIG. 4 is a schematic view of a transmission system using the optical transmission device shown in FIG. 3 in an optical communication network based on a master-slave method using one optical fiber transmission path.

FIG. 4 shows one example of a master-slave type transmission system to which the above optical transmission device is connected.

In FIG. 4, an optical transmission path (13) formed of one optical fiber is provided with a controller [master station] (28) for controlling signals on a bus and instruments [slave stations] (29–34) for transmitting and receiving signals to/from the controller, and the terminal end of the optical fiber transmission path is provided with a terminator (35) for preventing the light reflection.

In the above system, the master station (28) sends a signal transmission demand to each of the salve stations (29–34), and each of the slave stations (29–34) can communicate with communication procedures responding thereto. When the number of the slave stations to be connected exceeds the above maximum number of devices, a repeater is inserted to the optical fiber transmission path (13) to amplify an attenuated optical signal, whereby the number of devices to be connected can be increased. This point is also true of examples to be described later.

A signal from the master station (28) is transmitted through the optical fiber transmission path (13). The signal is all directed to the main-line waveguide (11) of the optical waveguide module having the main-line waveguide in the optical transmission device (FIG. 3). Part of the signal which is being propagated through the main-line waveguide (11) is directed to the branch waveguide (21) and received in the light-receiving device (25). The remainder of the signal is directed to the optical fiber transmission path (13) in an opposite end of the main-line waveguide (11).

The optical signal received in the light-receiving device (25) is converted to a predetermined electric signal with an optical/electric converter portion of the electric circuit (2), and transmitted to the slave station through the electric signal input/output portion (6). An electric signal transmitted from the slave station is directed to the optical transmission device through the electric signal input/output portion (6). The electric signal is converted to a light-emitting device drive signal with an electric/optical converter portion of the electric circuit (2), and further converted to an optical signal with the light-emitting device (26), and the optical signal is sent to the branch waveguide (22), directed to the main-line waveguide (11) and directed to the main-line optical fiber transmission path (13).

FIG. 5 shows one example of the internal arrangement of a transmission device formed by encasing in one box (3) the optical waveguide module having two main-line waveguides, provided by the present invention, when two optical fiber transmission paths (13,14) formed of a pair of transmitting and receiving transmission paths are used. As compared with the optical waveguide module in FIG. 1, the above optical waveguide module having two main-line waveguides shows a decrease in attenuation caused by branching due to the presence of only one branching portion, and a larger number of transmission devices can be installed. Numerals 4 and 5 in FIG. 5 show optical signal input/output portions of the optical transmission device.

Figure 6:
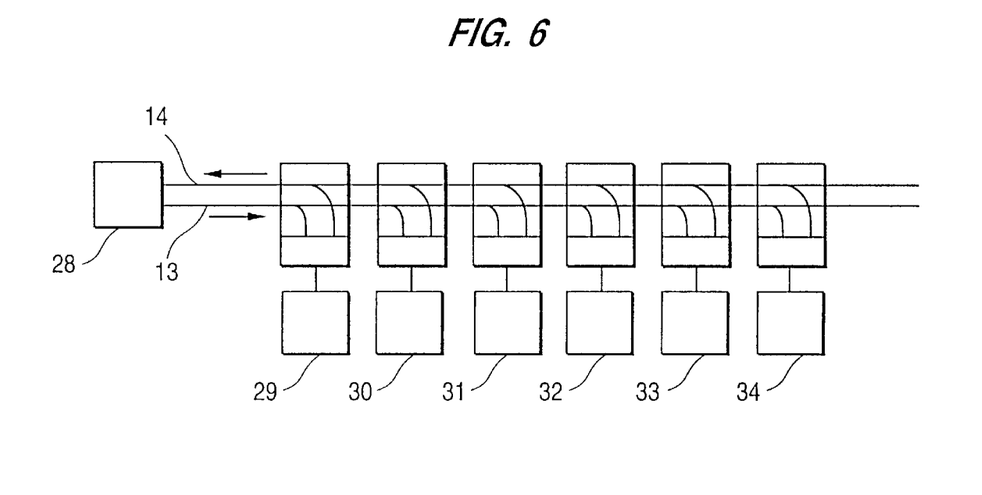
FIG. 6 is a schematic view of a transmission system using the optical transmission device shown in FIG. 5 in an optical communication network based on a master-slave method using two optical fiber transmission paths.

FIG. 6 shows one example of a master-slave type transmission system provided with the above transmission device.

The system in FIG. 6 permits communication with communication procedures similar to those in the system in FIG. 4. The system in FIG. 6 uses two optical fibers as optical transmission paths, and the directions in which light is propagated are strictly separated. Therefore, the above system is advantageous in that a master station (28) does not require a light branching device and that a reflection-preventing terminator on the terminal end of the optical fiber is no longer necessary.

FIG. 7 shows one example of internal arrangement of a transmission device formed by encasing in one box (3) the optical waveguide module having a main-line waveguide (1), provided by the present invention, when one optical fiber is used for bilateral transmission and reception of signals.

Figure 8:
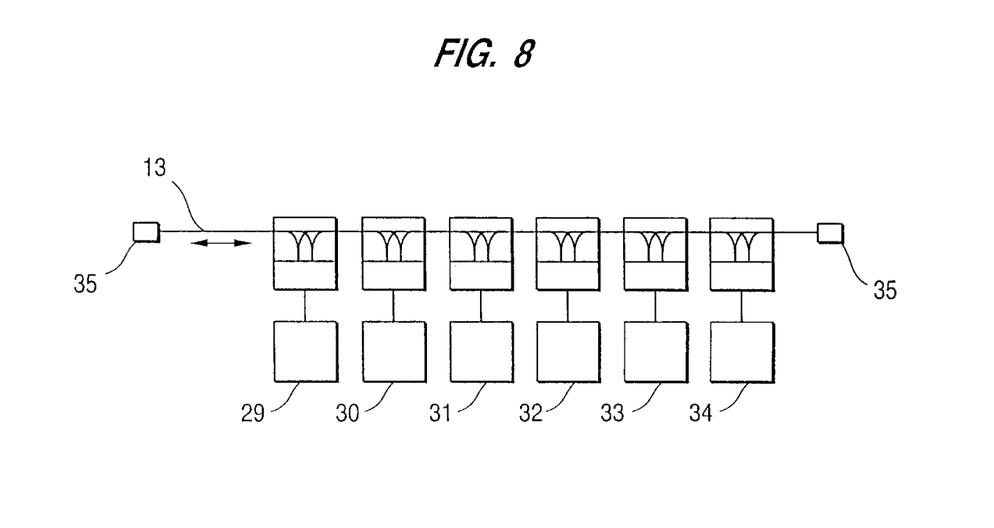
FIG. 8 is a schematic view of an optical transmission system using the optical transmission device shown in FIG. 7 in an optical communication network based a pier to pier method using one optical fiber.

FIG. 8 shows one example of a pier to pier transmission system having the above transmission device, in which instruments (29–34) for bilateral transmission and reception of signals are provided to an optical transmission path (13) formed of one optical fiber and each of end terminals of the optical fiber is provided with a terminator (35) for preventing light reflection.

Each of the instruments (29–34) transmits a signal from its own station bilaterally through the optical transmission path (13) and receives a signal transmitted from other instrument through the optical transmission path (13).

In the above system, the instruments (29–34) can communicate with one another with communication procedures for LAN such as ISO/IEC 8802-3.

FIG. 9 is one example of the internal arrangement of a transmission device formed by encasing in a box (3) the optical waveguide module having main-line waveguides (11,12), provided by the present invention, when two optical fibers are used in FIG. 7. As compared with the module in FIG. 7, the optical waveguide module in FIG. 9 has two branching portions so that the attenuation caused by branching is low, whereby a larger number of transmission devices can be provided.

Figure 10:
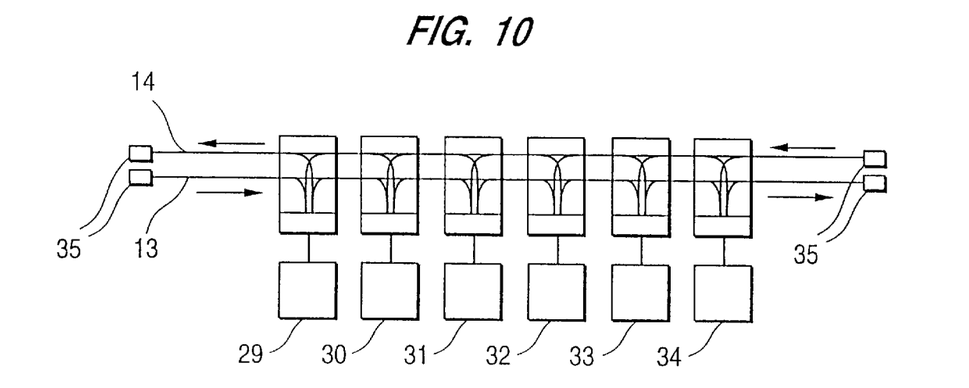
FIG. 10 is a schematic view of an optical transmission system using the optical transmission device shown in FIG. 9 in an optical communication network based on a pier to pier method using two optical fiber transmission paths.

FIG. 10 shows one example of a pier to pier transmission system provided with the above transmission device, in which instruments (29–34) which transmit and receive a signal to/from one another are provided to optical transmission paths (13,14) formed of two optical fibers and each of end terminals of each optical fiber is provided with a terminator (35) for preventing light reflection.

Each of the instruments (29–34) bilaterally transmits a signal of its own station through the optical transmission paths (13 and 14) and receives a signal from other instrument through the optical transmission path (13 or 14).

In the above system, the instruments (29–34) can communicate with one another with communication procedures for LAN such as ISO/IEC 8802-3.

Figure 11:
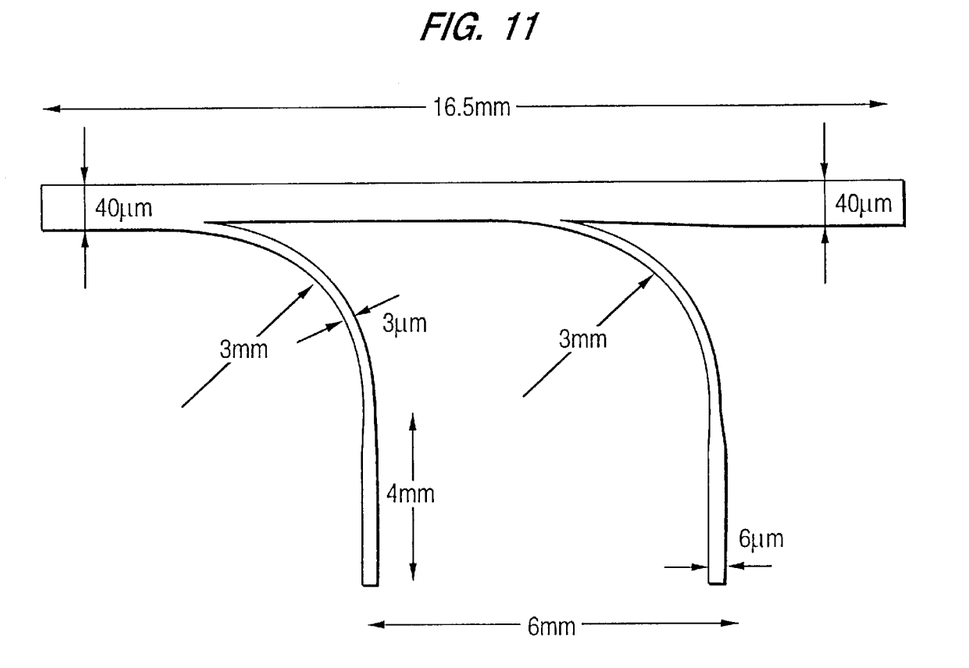
FIG. 11 is a schematic view of the form of a plane polymer waveguide used in the optical waveguide having one main-line waveguide shown in FIG. 1.
Figure 12:
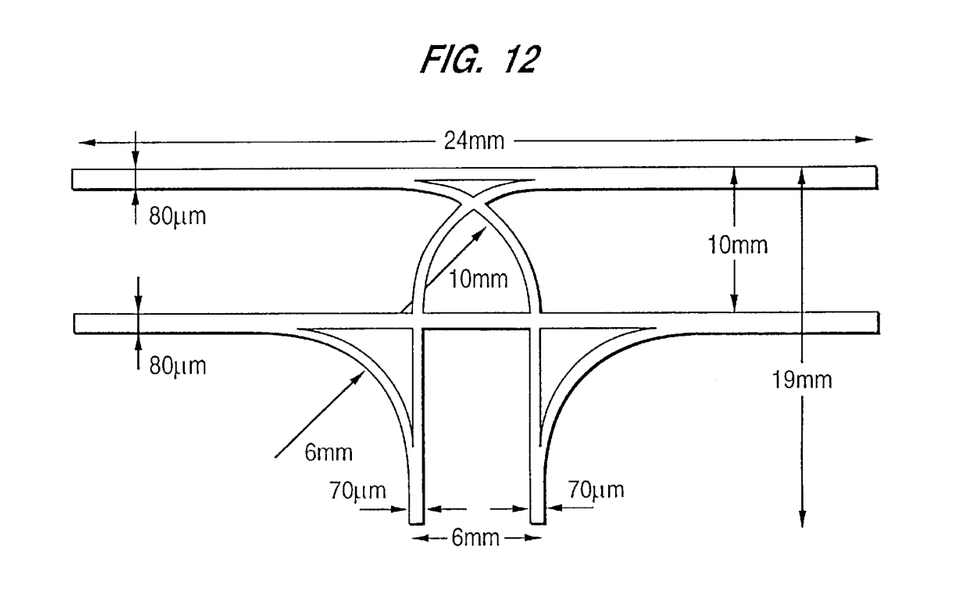
FIG. 12 is a schematic view of the form of a plane polymer waveguide used in the optical waveguide having two main-line waveguides shown in FIG. 9.

FIGS. 11 and 12 show details of the optical waveguide having a main-line waveguide, shown in FIGS. 3 and 9, and tests of the optical waveguide for their performances are described in Examples 1 and 2.

In the present invention, as explained above, optical signals through the optical fiber transmission paths (13,14) are all directed to the main-line waveguides (11,12) of the optical waveguide module (1) having the main-line waveguides and again directed the optical fiber transmission paths (13,14). Part of the above optical signals are propagated into the branch waveguides through the branch waveguides (21,22,23,24) provided to the main-line waveguides (11,12). These main-line waveguides (11,12) and the branch waveguides (21,22,23,24) are produced in a single plane film.

As described above, when an optical signal from the optical fiber transmission path enters the transmission device, passes the main-line waveguide and the subsequent optical transmission path, there is a loss ($\alpha$) caused by the branching of the signal to the branch waveguide and a loss ($\delta$) caused by factors other than the branching.

Of the above losses, the loss ($\alpha$) caused by the branching can be nearly considered to be a ratio of the width of the branch waveguide to the width of the main-line waveguide. The loss ($\delta$) caused by factors other than branching mainly includes a connection loss caused by a difference between the cross-sectional form of the optical fiber and the cross-sectional form of the optical waveguide and a propagation loss caused by the materials of the waveguides, and when a connector is used, there is caused a slight connector loss.

Both $\alpha$ and $\delta$ are preferably small for decreasing a transmission loss, while the decreasing of $\delta$ is limited since it is almost determined by the form of the waveguides and the materials of the waveguides. However, $\alpha$ can be determined freely although it is required to secure the necessary minimum of an optical signal intensity.

When a waveguide pattern is designed, it is therefore essential to determine the value of $\alpha$ depending upon the number of transmission devices to be connected and the dynamic range of a light-receiving circuit. For a system as a whole, further, it is necessary to consider a transmission loss caused by the optical fiber itself which is used as the optical transmission path.

Specifically, in the master-slave type transmission system shown in FIG. 11, the optical circuit pattern was designed under conditions where 500 m of a 50/125 GI optical fiber would be used as a transmission path, the loss caused by factors other than branching would be 1.9 dB and the number of transmission devices would be approximately 10 to 15.

Further, in the pier-to-pier type transmission system shown in FIG. 12, the optical circuit pattern was designed under conditions where 500 m each of 100/140 GI optical fibers would be used as transmission paths, the loss caused by factors other than branching would be 2 dB and the number of transmission devices would be approximately 10 to 15.

The optical waveguide module having a main-line waveguide, provided by the present invention, is formed in a single plane film. This structure serves to design branching properties as required, which properties are important, and to materialize an optical transmission device excellent in branching accuracy and reproducibility. For example, the branching ratio can be brought to a desired value by adjusting the line widths of the waveguides, and the optical waveguide module is excellent in reproducibility.

Further, the size of the optical waveguide module as a whole can be downsized since the module can be formed of a small plane optical waveguide.

Further, since an optical signal from the light-emitting device (26) of a station is not directly received with the light-receiving device (25) of the same station, and the received-light intensity is very small, it is not required to provide an electric circuit for invalidating a cross talk which is a problem in electric transmission, or a very simple separation circuit is sufficient for materialization.

Further, the light-emitting device (26) and the light-receiving device (25) are connected to one end surface of the plane optical waveguide having the structure of a sandwich formed with two glass plates (38), and further, the end surface opposite to the above end surface has the structure formed by oblique cutting or grinding, whereby the sneaking of an optical signal which comes from its own station and leaks from the plane optical waveguide can be prevented, and the signal from its own station is hardly received. The electric circuit for invalidating a signal transmitted from its own station can be eliminated.

EXAMPLES

The optical transmission device of the present invention will be explained more in detail with reference to Examples hereinafter. The following Examples are given for specific explanations and shall not limit the working mode and the scope of the present invention.

Example 1

FIG. 11 illustrates an example of the plane optical waveguide of the optical waveguide module having a main-line waveguide used in the master-slave type transmission system shown in FIG. 4.

The plane optical waveguide was formed by a selective photopolymerization method (JP-B-56-3522). Specifically, a PCZ resin was dissolved in methylene chloride, and proper amounts of an acryl monomer and a photopolymerization initiator were added. A film was formed from the resultant solution by evaporating the solvent according to a casting method. The film was exposed to ultraviolet light through a photo mask to polymerize the monomer, whereby a cladding portion was formed. Then, the monomer which underwent no polymerization was removed by drying, to form a core portion. The so-obtained film (37) was sandwiched between two glass plates (38) to obtain the plane waveguide.

The above plane waveguide had been so designed as to be connectable to a multi-mode quartz fiber having a core diameter of 50 $\mu$m and a cladding diameter of 125 $\mu$m. In the plane optical waveguide, the main-line portion had a line width of 40 $\mu$m and the branch portions had a line width of 3 $\mu$m. The film had a thickness of 40 $\mu$m.

Fibers are connected to both end surfaces of the main-line portion of the plane optical waveguide with a highly optically transparent epoxy-containing adhesive, and an SiPIN photodiode and a 780 nm laser diode were similarly bonded to both end surfaces of the branch portions with the same adhesive. The SiPIN photodiode and the laser diode were connected to a transmission/reception circuit to obtain an optical transmission device.

The above transmission device was measured for optical properties to show a branching ratio, from the main-line portion, of 1:0.08 and a loss, caused by passing through the transmission device, of 2 dB. An amplification circuit having a dynamic range of 30 dB was used for the SiPIN photodiode to receive a signal. Since there were two branch portions, the maximum number of transmission devices that were permitted for communication was 12.

Example 2

FIG. 12 illustrates an example of the plane optical waveguide of the transmission device used in the pier-to-pier type transmission system shown in FIG. 10. The plane optical waveguide was obtained in the same manner as in Example 1.

A multi-mode fiber having a core diameter of 100 $\mu$m and a cladding diameter of 140 $\mu$m was used as optical fibers of the optical transmission paths. The waveguide was designed to be applied to the multi-mode fiber. The main-line portions had a line width of 80 $\mu$m, and the branch portions had a maximum line width of 70 $\mu$m. The above optical fibers were connected to both ends of the main-line portions of the plane optical waveguide, and an avalanche photodiode and a 780 nm laser diode were connected.

The above-obtained transmission device was measured for optical properties to show a branching ratio, from the main-line portion, of 1:0.3 and a loss, caused by passing through the transmission device, of 2 dB. An avalanche photodiode operable at a charged voltage of 110 V was used as a light-receiving device, and an amplification circuit having a dynamic range of 35 dB was used. Therefore, the maximum number of transmission devices that were permitted to be connected for communication was 12.

As explained above, the optical waveguide module having a main-line waveguide and the optical transmission device using it, provided by the present invention, use a plane optical waveguide, so that branching properties can be easily designed, the branching properties have reproducibility and the module and the equipment can be downsized. Further, due to the above properties, there can be provided an optical transmission system which can be easily set and is inexpensive.

What is claimed is:

1. An optical waveguide module for branching of an optical signal, said optical waveguide module being connectable to an optical transmission path for receiving or transmitting the optical signal, said optical waveguide module comprising:

a main-line waveguide for connection to the optical transmission path to operate as part of the optical transmission path;

at least one pair of branch waveguides which are unidirectionally branched from said main-line waveguide, each of said at least one pair of branch waveguides reaching one end surface of said optical waveguide module;

each of said main-line waveguide and said at least one pair of branch waveguides comprising an optically transparent polymer film with a refractive index distribution;

a light-receiving device being connected to a first branch waveguide of said at least one pair of branch waveguides; and a light-emitting device being connected to a second branch waveguide of said at least one pair of branch waveguides.

2. The optical waveguide module as set forth in claim 1 wherein said at least one pair of branch waveguides is formed of one pair.

3. The optical waveguide module as set forth in claim 1 wherein said main-line waveguide includes a first main-line waveguide and a second main-line waveguide, said first branch waveguide being unidirectionally branched from said first main-line waveguide and said second branch waveguide being unidirectionally branched from said second main-line waveguide.

4. The optical waveguide module as set forth in claim 1 wherein said at least one pair of branch waveguides comprises two pairs of branch waveguides, a first pair of branch waveguides including said first and second branch waveguides, a second pair of branch waveguides including third and fourth branch waveguides, said first and fourth branch waveguides being connected to said light-receiving device, said second and third branch waveguides being connected to said light-emitting device, said first and second branch waveguides being branched in one direction from said main-line waveguide while said third and fourth branch waveguides are branched in an opposite direction from said main-line waveguide.

5. The optical waveguide module as set forth in claim 1 wherein:

said main-line waveguide includes a first main-line waveguide and a second main-line waveguide;

said at least one pair of branch waveguides comprises two pairs of branch waveguides, a first pair of branch waveguides including said first and second branch waveguides, and a second pair of branch waveguides including third and fourth branch waveguides;

said first and fourth branch waveguides being connected to said light-receiving device, and said second and third branch waveguides being connected to said light-emitting device;

said first and third branched waveguides being branched from said first main-line waveguide while said second and fourth branch waveguides are branched from said second main-line waveguide; and said first and second branch waveguides being branched in one direction while said third and fourth branch waveguides are branched in an opposite direction.

6. The optical waveguide module as set forth in claim 1 wherein said optical waveguide module includes an end surface and an oblique end surface opposite to said end surface; said light-receiving device and said light-emitting device being connected to said end surface.

7. An optical transmission device comprising:

an optical waveguide module for branching of an optical signal, said optical waveguide module being connectable to an optical transmission path for receiving or transmitting the optical signal, said optical waveguide module including a main-line waveguide for connection to the optical transmission path to operate as part of the optical transmission path, at least one pair of branch waveguides which are unidirectionally branched from said main-line waveguide, each of said at least one pair of branch waveguides reaching one end surface of said optical waveguide module, each of said main-line waveguide and said at least one pair of branch waveguides comprising an optically transparent polymer film with a refractive index distribution, a light-receiving device being connected to a first branch waveguide of said at least one pair of branch waveguides, and a light-emitting device being connected to a second branch waveguide of said at least one pair of branch waveguides;

an electric control circuit connected to said optical waveguide module for controlling said light-receiving device and said light-emitting device; and an electric signal input/output portion connected to said optical waveguide module.

* * * * *